United States Patent
Hunter

[11] Patent Number: 6,147,471
[45] Date of Patent: Nov. 14, 2000

[54] SINGLE-POINT DIRECT CURRENT CONNECTOR

[76] Inventor: Alton G. Hunter, 9800 Chandler Dr., Raleigh, N.C. 27615

[21] Appl. No.: 09/411,825

[22] Filed: Oct. 1, 1999

[51] Int. Cl.[7] ................................ H02J 7/00; H01R 3/00
[52] U.S. Cl. ............................................ 320/105; 439/500
[58] Field of Search ............................. 320/105; 439/500

[56] References Cited

U.S. PATENT DOCUMENTS

| | | | |
|---|---|---|---|
| 1,999,945 | 6/1933 | Rathburn . | |
| 4,226,497 | 10/1980 | Polonsky et al. | 339/184 |
| 4,555,451 | 11/1985 | Harrod et al. | 429/1 |
| 4,637,965 | 1/1987 | Davis | 429/1 |
| 4,756,978 | 7/1988 | Nitcher et al. | 429/1 |
| 4,885,524 | 12/1989 | Wilburn | 320/25 |
| 4,972,135 | 11/1990 | Bates | 320/25 |
| 5,921,809 | 7/1999 | Fink | 439/504 |

Primary Examiner—Shawn Riley
Assistant Examiner—Gregory J. Toatley, Jr.
Attorney, Agent, or Firm—Mills Law Firm, PLLC

[57] ABSTRACT

This invention can either be built into sources of direct current, or can modify existing sources of direct current to provide a quick-connect and disconnect single point direct current connector that prevents reverse polarity from occurring. This is in the form of a receptacle connected to positive and negative terminals with positive and negative openings into which positive and negative prongs of a plug can be inserted. The other end of the plug cable can be permanently or removably connected to jumper cable clips, to another male plug, or directly to the equipment that is driven by the direct current.

7 Claims, 3 Drawing Sheets

SINGLE-POINT DIRECT CURRENT CONNECTOR

BACKGROUND OF INVENTION

1. Field of Invention

This invention relates to electrical connectors and more particularly to a quick-connect and disconnect single point direct current connector.

A single point electrical connector for alternating current is common because of the sine wave characteristics of this type of electrical current. On the other hand, direct current has a positive current flow and a negative or ground. If these polarities are crossed, dangerous arcing can occur, particularly at higher amperages. Also, any devices that are connected with opposite polarity can be badly damaged or destroyed.

Because of the above problems with direct current, the terminals are clearly marked with "plus" and "minus" indicia as well as often being red and black color-coded. Additionally, particularly on high amperage applications such as storage batteries, fuel cells and the like, the terminals are spaced widely apart in an effort to reduce the possibility of a direct short across the terminals. This wide spacing of the terminals requires two-point connections for direct voltage applications, one connection for the positive and one connection for the negative. This is not only time consuming in connecting and disconnecting, but it also makes the system twice as expensive as alternate current connections.

Attempts have been made to improve the safety in high amperage direct current applications such as storage batteries and fuel cells. These systems have all required modification to the power sources, which makes them impractical due to the cost involved in totally redesigning such terminals. The reason for this is manufacturers must commit to production and inventory space which requires a large expenditure in capital. Distributors, retailers and vendors all must also commit to space and capital to inventory newly designed batteries and fuel cells while maintaining an inventory of conventional units. Thus there is no practical product that addresses the cross polarity danger.

2. Concise Explanation of Prior Art

U.S. Pat. No. 1,999,945 to Raymond E. Rathbum discloses a storage battery with terminal mounted in a retaining structure.

U.S. Pat. No. 4,226,497 to Samuel Polonsky and Edward V. Pomponio, assignee General Electric Company of New York, N.Y. discloses a 9-volt battery terminal with different shaped connectors so it cannot be reversed polarity mounted. Reverse polarity contact, however, can easily occur with resultant damage.

U.S. Pat. No. 4,555,451 to Lawrence R. Harrod and Lucio C. Perego, assignee Pines of America, Inc. of Fort Wayne, Ind. discloses a storage battery with a built in fuse which is good for special applications but would be very expensive to produce.

U.S. Pat. No. 4,637,965 to Ronald G. Davis, assignee H. Milton Keathley and Douglas Michael Phenix, both of Erick, Okla. discloses an anticorrosion battery terminal for wet cell automotive storage batteries.

U.S. Pat. No. 4,756,978 to Walter Nitcher discloses a battery and mount with mating contacts.

U.S. Pat. No. 4,885,524 to William M. Wilburn, assignee William J. Goldcamp of Portsmouth, Ohio discloses a specially designed vehicle battery system with a plug that can be used in conjunction with a specially designed jumper cable for the purpose of starting vehicles with bad or weak batteries.

Finally, U.S. Pat. No. 4,972,135 to Bobby l. Bates and Wesley V. Bates discloses a switching system for battery jumper cables that includes an automatic polarity-sensing circuit which prevents current from flowing until the correct polarity is connected.

BRIEF DESCRIPTION OF INVENTION

After much research and study into the above mentioned problems, the present invention has been developed to provide a single point direct current connector that does not require major modifications to existing storage batteries, fuel cells and the like. This connector can be either factory-installed or retrofitted. When installed, the connector is a convenient single point connection that solves the cross polarity safety problems that exist with the prior art systems.

The present invention permits a transition period within the market place and does not require reeducation of the public to use the same.

The above is accomplished by providing a connector that mounts on the conventional positive and negative posts terminals as well as on internal screw terminals that are provided on many batteries today.

A female receptacle with different configured openings for positive and negative is provided. A male plug with the same configured terminal is adapted to be plugged to the receptacle. A connecting cable carrying the positive and negative current can then be connected to DC equipment in the normal manner.

In view of the above it is an object of the present invention to provide a single-point direct current connector that does not require modification to existing storage batteries and fuel cell designs.

Another object of the present invention is to provide a single-point direct current connector that eliminates the possibility of cross connection between positive and negative electrodes.

Another object of the present invention is to provide a single-point direct current connector that bridges between positive and negative terminals and has different shaped positive and negative receptacles to prevent cross polarity dangers.

Another object of the present invention is to provide a simple, relatively inexpensive single-point direct current connector for existing storage batteries, fuel cells and the like.

Other objects and advantages of the present invention will become apparent and obvious from a study of the following description and the accompanying drawings that are merely illustrative of such invention.

DETAILED DESCRIPTION OF INVENTION

Figure 1:
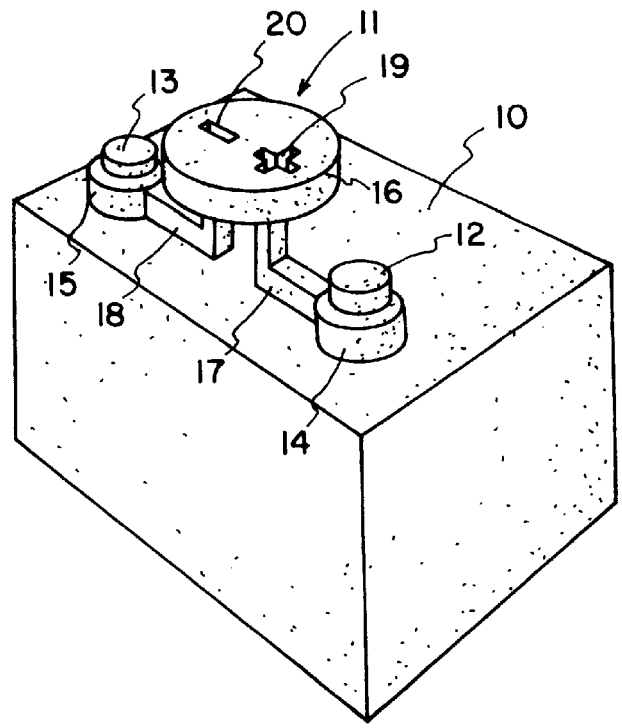
FIG. 1 is a perspective view of a standard storage battery with the single-point direct current connector of the present invention mounted thereon.

With further reference to the drawings, three types of storage batteries are shown. The first, as clearly seen in FIG. 1, is a top post terminal type storage battery that is used in almost all production vehicles except those made by General Motors Corporation of Detroit, Mich. The side screw terminal storage battery shown in FIG. 2 is the type of battery used in current production by General Motors vehicles while FIG. 3 shows a combination storage battery with both screw side terminals and top post terminals which makes it a universal vehicle battery for production vehicles.

Since storage batteries 10, 10' and 10" of the type described are well known to those skilled in the art, further detailed discussion of the same is not deemed necessary.

The single point direct current connection of the present invention, indicated generally at 11 is shown mounted on the positive top post terminal 12 and the negative top post terminal 13 of battery 10 in FIG. 1. The connection of the present invention includes positive terminal clamp 14 and negative terminal clamp 15. Each of these terminal clamps is electrically connected to receptacle 16 by insulated bridge conduits 17 and 18. The receptacle 16 has a positive prong opening 19 and a negative prong opening 20 as can clearly be seen in FIGS. 1 through 3. Since electrical receptacles, post terminal clamps and electrical receptacles for receiving prongs of plugs are well known to those skilled in the art, further detailed discussion of the same is not deemed necessary.

Figure 2:
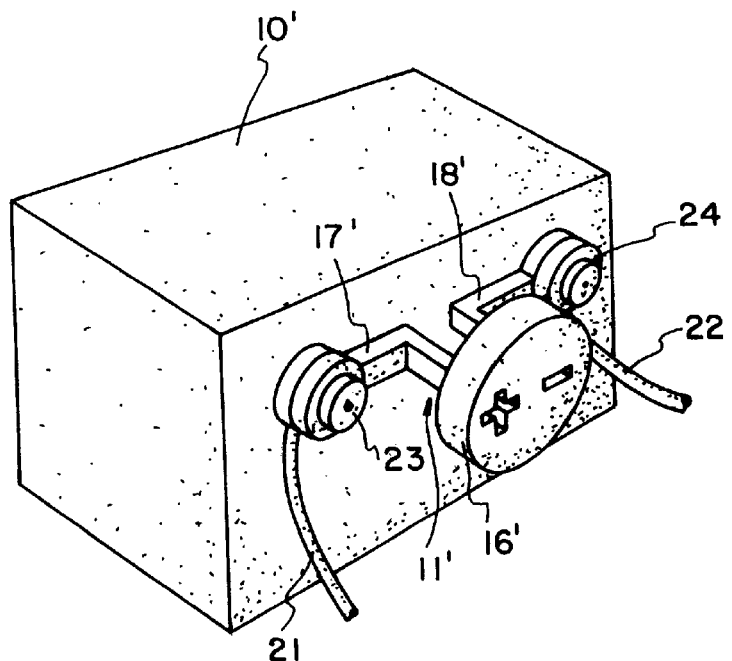
FIG. 2 is a perspective view of a storage battery having side screw terminals with the connector of the present invention mounted thereon.
Figure 3:
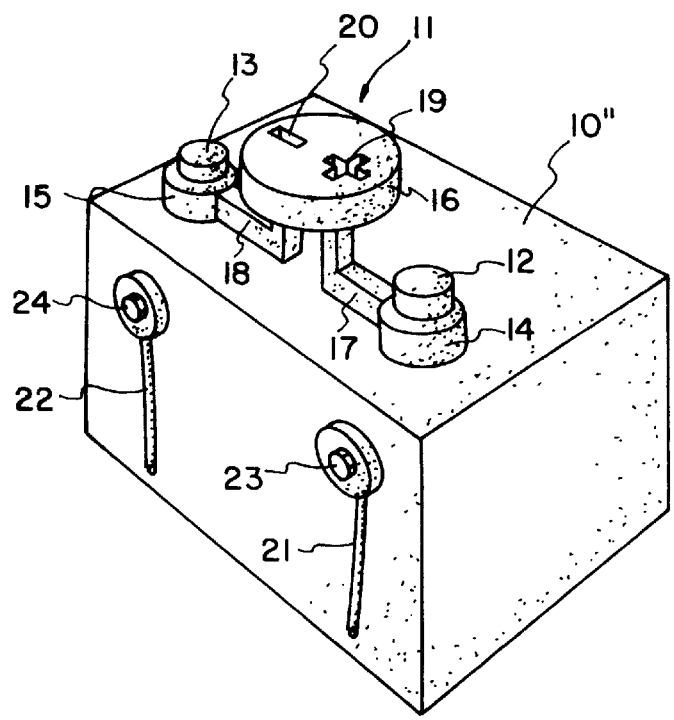
FIG. 3 is a perspective view of a vehicle type storage battery having side screw terminals, with electrical cables connected thereto and top post terminals with the connector of the present invention mounted thereon.

The side screw terminal battery 10' shown in FIG. 2 includes conventional positive electrical cable 21 and a conventional negative electrical cable 22 operatively connected to positive screw terminal 23 and negative screw terminal 24. Also electrically connected to the positive and negative screw terminals 23 and 24 are insulated positive bridge conduit 17' and insulated negative bridge conduit 18' which are connected to electrical receptacle 16' in the same manner as hereinabove described for the post terminal connection shown in FIG. 1.

The universal storage battery 10" shown in FIG. 3 has a positive electrical cable 21' operatively connected to positive screw terminal 23' and a negative electrical cable 22' operatively connected to negative screw terminal 24'. These cables are connected to any desired load whereby the storage battery 10' functions in the normal way. The single point, direct current connection 11' can be connected to the top post terminals 12 and 13 in the same manner used as heretofore described in FIG. 1.

Figure 4:
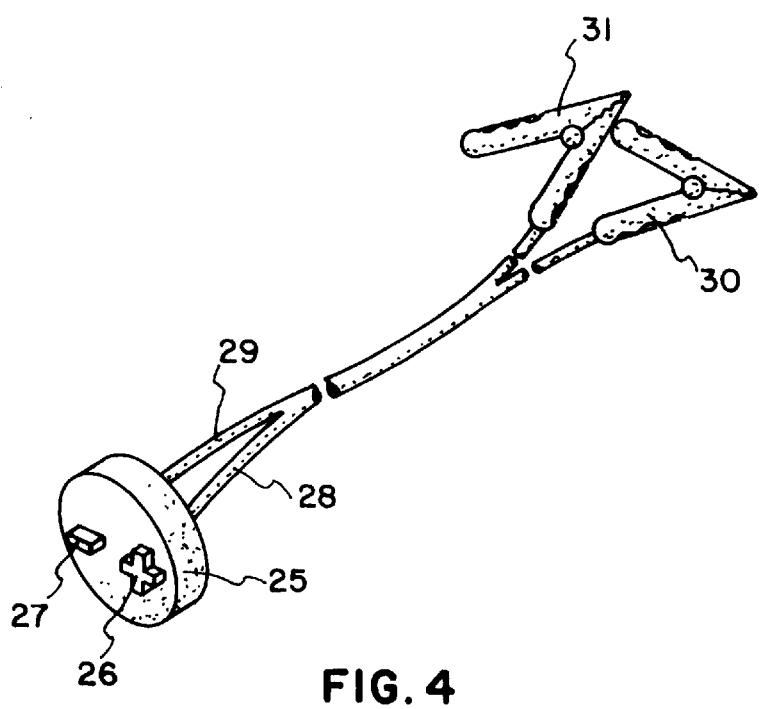
FIG. 4 is a pair of conventional jumper cables with one end having a single-point connector plug mounted thereon.
Figure 5:
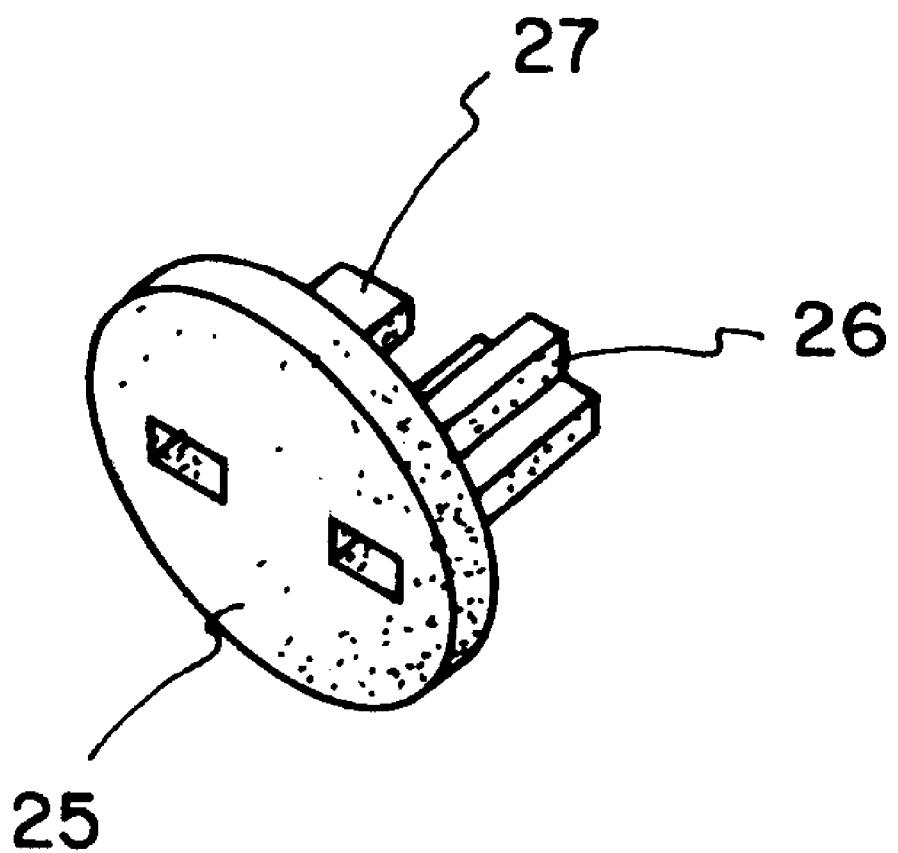
FIG. 5 is a perspective view of the plug shown in FIG. 4 with the cables disconnected from the cable clips.

A typical electrical cable is shown in FIG. 4 wherein an electrical plug 25 has a positive prong 26 adapted to be inserted in opening 19 of receptacle 16 and a negative prong 27 adapted to be inserted into opening 20 of receptacle 16. Positive prong 26 is electrically connected to insulated positive cable 28 with the negative prong 27 being electrically connected to the insulated negative cable 29. The opposite end of the cables can be connected to a second plug 25, to positive and negative jumper cable clips 30 and 31 or to any other desired means.

To use the quick-connect and disconnect single-point direct current connector of the present invention, the same is operatively mounted on either the post terminal or the screw terminal of the battery, fuel cell or other source of DC power. Whenever it is desired to run an auxiliary electrical cable for either temporary purposes such as jumper cables or as a permanent connection, the prongs 26 and 27 of plug 25 are plugged into the respective openings 19 and 20 of receptacle 16. The battery, fuel cell or other source of DC current is then ready to use.

From the above it can be seen that the present invention can be mounted on different sources of DC current with or without other electrical cables being connected to the same terminals. When so mounted, the plug 25 of the connection can be inserted into the receptacle 16 thereof without worry of correct polarity since a plug will fit into the receptacle only one way, positive to positive and negative to negative.

The term top, side, and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A jumper cable adapter for providing an auxiliary direct current to a storage battery having a projecting cylindrical positive terminal post and a projecting cylindrical negative terminal post laterally spaced a fixed distance from said positive terminal, said adapter comprising: a receptacle member having a first terminal slot and a second terminal slot, said terminal slots having non-complementary configurations, said first terminal slot adapted to telescopically receive a complementary shaped positive electrical connector connected to a positive pole of an auxiliary source of direct current, said second terminal slot adapted to telescopically receive a complementary shaped negative electrical connector connected to a negative pole of the auxiliary source of direct current; a positive bridge conductor member having a first end connected to said adapter member and operatively engagable with said positive conductor member and a second end having a cylindrical aperture therein for accommodating physical and electrical connection with said positive terminal post of said storage battery; a negative bridge connector member having a first end connected to said adapter member and operatively engagable with said negative conductor member and a second end having a cylindrical aperture therein for accommodating physical and electrical connection with said negative terminal of said storage battery, said second end of said positive bridge connector member and said second end of said positive bridge connector member having a spacing therebetween at least equal to said fixed distance between said positive terminal post and said negative terminal post of said storage battery whereby direct current may be alternatively routed to said terminal posts of said storage battery from said auxiliary source by one-way insertion of said electrical connector members into said terminal slots of said receptacle member.

2. The jumper cable adapter as recited in claim 1 wherein said first terminal slot has a "+" shape and said second terminal slot has a "−" shape.

3. The jumper cable adapter as recited in claim 1 wherein said bridge connector members are rigid.

4. The jumper cable adapter as recited in claim 3 wherein said first end and said second end of each of said bridge connectors are connected by a L-shaped leg whereby said receptacle member is supported on and spaced from said storage battery.

5. The jumper cable adapter as recited in claim 1 wherein said terminal posts are provided on a top surface of said storage battery.

6. The jumper cable adapter as recited in claim 1 wherein said terminal posts are provided on a side surface of said storage battery.

7. A jumper cable accessory for providing an auxiliary direct current from an auxiliary battery to a storage battery characterized by projecting cylindrical positive and negative terminals laterally spaced a fixed distance apart, said jumper cable accessory comprising: a jumper cable having a plug member having a first male terminal and a second male terminal, said terminals having non-complementary configurations; a receptacle having a first female terminal slot and a second female terminal slot, said female terminal slots having non-complementary configurations wherein, said first female terminal slot is complementary to and telescopically receives said first male terminal and said second female slot is complementary to and telescopically receives said second male terminal; a first connector bridge having a first end connected to said receptacle and operatively engagable with said first male terminal and a second apertured end accommodating physical and electrical connection with said positive terminal of said storage battery; a second connector bridge having a first end connected to said receptacle and operatively engagable with said second male terminal and a second end having a cylindrical aperture therein for accommodating physical and electrical connection with said negative terminal of said storage battery, said second ends of said connector bridges having a spacing therebetween at least equal to said fixed distance between said positive terminal and said negative post of said storage battery.

* * * * *